(12) United States Patent
Koga (10) Patent No.: US 8,120,633 B2
(45) Date of Patent: Feb. 21, 2012

(54) SCANNING OPTICAL APPARATUS, IMAGE FORMING APPARATUS, AND CONTROL METHOD

(75) Inventor: Katsuhide Koga, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 12/548,904

(22) Filed: Aug. 27, 2009

(65) Prior Publication Data

US 2010/0074651 A1 Mar. 25, 2010

(30) Foreign Application Priority Data

Sep. 25, 2008 (JP) ................................. 2008-246597

(51) Int. Cl.
*B41J 2/435* (2006.01)
(52) U.S. Cl. ......................................... 347/236; 347/246
(58) Field of Classification Search .................. 347/229, 347/234–237, 246–254
See application file for complete search history.

(56) References Cited

U.S. PATENT DOCUMENTS

| 6,266,078 B1 | 7/2001 | Koga et al. ............... 347/236 |
| 6,396,858 B2 | 5/2002 | Kawakami et al. ........ 372/38.02 |
| 6,919,979 B2 | 7/2005 | Seki et al. .................. 359/204 |
| 7,268,797 B2 | 9/2007 | Hata et al. ................. 347/237 |
| 2007/0291101 A1* | 12/2007 | Hata et al. ................. 347/237 |
| 2009/0201358 A1* | 8/2009 | Nakamura ................. 347/260 |

FOREIGN PATENT DOCUMENTS

| JP | 1-101772 | 4/1989 |
| JP | 8-334710 | 12/1996 |
| JP | 2001-091882 | 4/2001 |
| JP | 2007-152766 | 6/2007 |
| JP | 2007152766 A * | 6/2007 |

* cited by examiner

*Primary Examiner* — Hai C Pham
(74) *Attorney, Agent, or Firm* — Fitzpatrick, Cella, Harper & Scinto (57) ABSTRACT

A scanning optical apparatus includes, for example, a light source that outputs a light beam that has been pulse width modulated in accordance with input image data and a deflection unit that deflects the light beam so that the light beam scans the surface of an image carrier in the main scanning direction. The scanning optical apparatus furthermore includes a correction unit that corrects the pulse width and light amount applied to the light beam at each scanning position in the main scanning direction on the image carrier in accordance with focus error in the light beam at each scanning position.

5 Claims, 11 Drawing Sheets

| INPUT | 201-1 | ... | 201-4 | ... | 201-10 | ... | 201-16 | ... | 201-22 | ... | 201-28 | ... | 201-32 |
|---|---|---|---|---|---|---|---|---|---|---|---|---|---|
| 00 | 00 | ... | 00 | ... | 00 | ... | 00 | ... | 00 | ... | 00 | ... | 00 |
| 10 | 08 | ... | 0B | ... | 0F | ... | 18 | ... | 0F | ... | 0B | ... | 08 |
| 20 | 11 | ... | 17 | ... | 1E | ... | 30 | ... | 1E | ... | 17 | ... | 11 |
| 30 | 2B | ... | 32 | ... | 39 | ... | 48 | ... | 39 | ... | 32 | ... | 2B |
| 40 | 33 | ... | 3C | ... | 44 | ... | 56 | ... | 44 | ... | 3C | ... | 33 |
| 50 | 3C | ... | 46 | ... | 50 | ... | 64 | ... | 50 | ... | 46 | ... | 3C |
| 60 | 44 | ... | 50 | ... | 5B | ... | 72 | ... | 5B | ... | 50 | ... | 44 |
| 70 | 4D | ... | 5A | ... | 66 | ... | 80 | ... | 66 | ... | 5A | ... | 4D |
| 80 | 55 | ... | 63 | ... | 72 | ... | 8E | ... | 72 | ... | 63 | ... | 55 |
| 90 | 5E | ... | 6D | ... | 7D | ... | 9C | ... | 7D | ... | 6D | ... | 5E |
| A0 | 66 | ... | 77 | ... | 88 | ... | AB | ... | 88 | ... | 77 | ... | 66 |
| B0 | 6F | ... | 81 | ... | 94 | ... | B9 | ... | 94 | ... | 81 | ... | 6F |
| C0 | 77 | ... | 8B | ... | 9F | ... | C7 | ... | 9F | ... | 8B | ... | 77 |
| D0 | 80 | ... | 95 | ... | AA | ... | D5 | ... | AA | ... | 95 | ... | 80 |
| E0 | 88 | ... | 9F | ... | B6 | ... | E3 | ... | B6 | ... | 9F | ... | 88 |
| F0 | 91 | ... | A9 | ... | C1 | ... | F1 | ... | C1 | ... | A9 | ... | 91 |
| FF | 99 | ... | B2 | ... | CC | ... | FF | ... | CC | ... | B2 | ... | 99 |

OUTPUT

FIG. 8

| BLOCK/MEMORY | LIGHT AMOUNT INCREASE AMOUNT | SET VALUE (H) |
|---|---|---|
| 203-1 | 40% | 66 |
| ... | ... | ... |
| 203-4 | 30% | 4C |
| ... | ... | ... |
| 203-10 | 20% | 33 |
| ... | ... | ... |
| 203-16 | 0% | 00 |
| ... | ... | ... |
| 203-22 | 20% | 33 |
| ... | ... | ... |
| 203-28 | 30% | 4C |
| ... | ... | ... |
| 203-32 | 40% | 66 |

SCANNING OPTICAL APPARATUS, IMAGE FORMING APPARATUS, AND CONTROL METHOD

BACKGROUND OF THE INVENTION

1. Field of the Invention

The present invention relates to a scanning optical apparatus, and particularly relates to a scanning optical apparatus that can be employed in an electrophotographic-type image forming apparatus.

2. Description of the Related Art

Electrophotographic-type image forming apparatuses form electrostatic latent images upon a photosensitive drum by scanning the drum with a light beam using an exposure apparatus. It is generally desirable for the diameter of the light beam spot formed upon the photosensitive drum to be constant regardless of what position upon the photosensitive drum the light beam spot is in. This is because if the diameter of the light beam spot is not constant, the thickness of lines will decrease or increase depending on the scanning position in the main scanning direction on the photosensitive drum. Accordingly, the exposure apparatus is provided with an optical system for collecting light beams output by the light source (for example, an f-θ lens or the like).

However, even if the light is collected using an f-θ lens, a slight amount of focus error will occur depending on the scanning position. For example, the spot diameter has differed by several µm between the scanning start side, the central area, and the scanning end side on the photosensitive drum.

If the exposure apparatus has a resolution of 600 dpi (that is, a spot diameter of 42 µm), optical adjustments are made so that the desired spot diameter is obtained in the central area of the scanning position, resulting in a spot diameter on the scanning start and end sides of approximately 46 µm. If the resolution is low, namely, up to approximately 600 dpi, this difference of 4 µm in the spot diameter can be ignored in terms of the problems it presents to image quality.

However, at high resolutions such as 2400 dpi (with a desired spot diameter of 10.5 µm), a 4 µm expansion in the spot diameter can no longer be ignored. The reason for this is that while 4 µm only causes the spot diameter to expand by 10% at 600 dpi, the same 4 µm causes the spot diameter to expand by approximately 40% at 2400 dpi. Furthermore, because the integrated amount of light when forming a single spot is constant, a spot whose diameter has expanded by 40% also contains 40% less light. Therefore, the light amount on the scanning start and end sides decreases relative to the light amount in the central area of the scanning position, which leads to a decrease in the darkness of the image. Thus expansion of the spot diameter caused by focus error in the optical system leads to a drop in image quality at high resolutions.

A technique in which a collimator lens, a cylindrical lens, or the like is moved in the optical axis direction (Japanese Patent Laid-Open No. H08-334710, or "Patent Document 1" hereinafter), a technique in which a light source, optical element, or the like is moved in the optical axis direction (Japanese Patent Laid-Open No. 2001-091882, or "Patent Document 2" hereinafter), and so on have been proposed as techniques for focusing the spot.

However, the methods disclosed in Patent Documents 1 and 2 are both nothing more than methods for performing focus optically. In other words, in order to focus the spot on any one scanning position, it is necessary to move the light source, optical element, lens, or the like at a high speed in accordance with the scanning position of the light beam upon the photosensitive drum. Because a scan occurs in an extremely small amount of time, it is difficult to implement such high-speed driving, and even if such high-speed driving could be implemented, it would incur high costs.

SUMMARY OF THE INVENTION

Accordingly, it is a feature of the present invention to solve at least one of these and other problems. For example, the present invention corrects focus error in a light beam at each scanning position using a comparatively simple and cost-effective method. Means to solve the other problems shall become apparent throughout the course of the following descriptions.

A scanning optical apparatus according to the present invention includes, for example, a light source that outputs a light beam that has been pulse width modulated in accordance with inputted image data and a deflection unit that deflects the light beam so that the light beam scans the surface of an image carrier in the main scanning direction. The scanning optical apparatus furthermore includes a correction unit that corrects the pulse width and light amount applied to the light beam at each scanning position in the main scanning direction on the image carrier in accordance with focus error in the light beam at each scanning position.

Further features of the present invention will become apparent from the following description of exemplary embodiments (with reference to the attached drawings).

DESCRIPTION OF THE EMBODIMENTS

An embodiment of the present invention shall be described hereinafter. The individual embodiment described hereinafter is useful in understanding the broader, intermediate, and more limitative concepts of the present invention. However, it should be noted that the technical scope of the present invention is defined by the appended claims, and is not intended to be limited by the individual embodiment described hereinafter.

Figure 1:
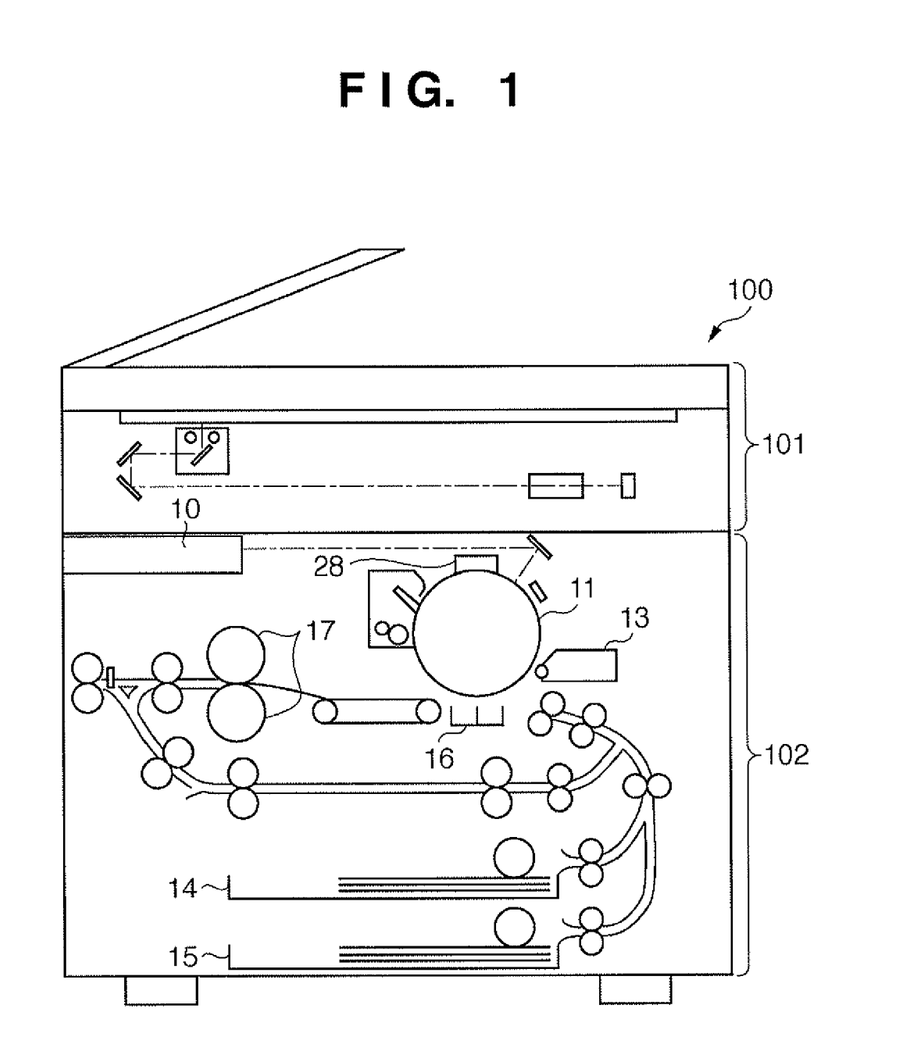
FIG. 1 is a schematic cross-section illustrating the overall configuration of an image forming apparatus according to the present invention.

FIG. 1 is a schematic cross-section illustrating the overall configuration of an image forming apparatus according to the present invention. Note that although a photocopier is used here as an example of the image forming apparatus, the image forming apparatus may be a printing apparatus, a printer, a multi-function peripheral, or a facsimile machine.

An image forming apparatus 100 includes an image reading unit 101 and an image forming unit 102. The image reading unit 101 reads an image of an original document, generates image data (an image signal) based thereupon, and outputs the image data to an exposure control unit 10 in the image forming unit 102. The exposure control unit 10 is also sometimes referred to as an exposure unit, a scanning optical apparatus, an optical scanning apparatus, or an optical scanner apparatus.

A photosensitive member 11 is an example of an image carrier, and has a drum (cylindrical) shape. A primary charger 28 uniformly charges the surface of the photosensitive member 11. The exposure control unit 10 includes a light source (for example, a laser) that outputs a pulse width modulated light beam based on the inputted image data, and a deflection unit (for example, a rotating polygonal mirror or a galvanometer mirror) that deflects the light beam so that the beam scans the surface of the image carrier in the main scanning direction. This light beam becomes irradiation light, by which a latent image is formed upon the image carrier (the photosensitive member 11). A developing apparatus 13 develops the latent image formed upon the image carrier, forming a toner image. Parallel to the formation of the toner image, a recording medium (paper, film, or the like) is conveyed from a first transfer member holding unit 14 or a second transfer member holding unit 15 to a transfer apparatus 16. The transfer apparatus 16 transfers the toner image onto the recording medium. A fixing apparatus 17 fixes the transferred toner image onto the recording medium.

Figure 2:
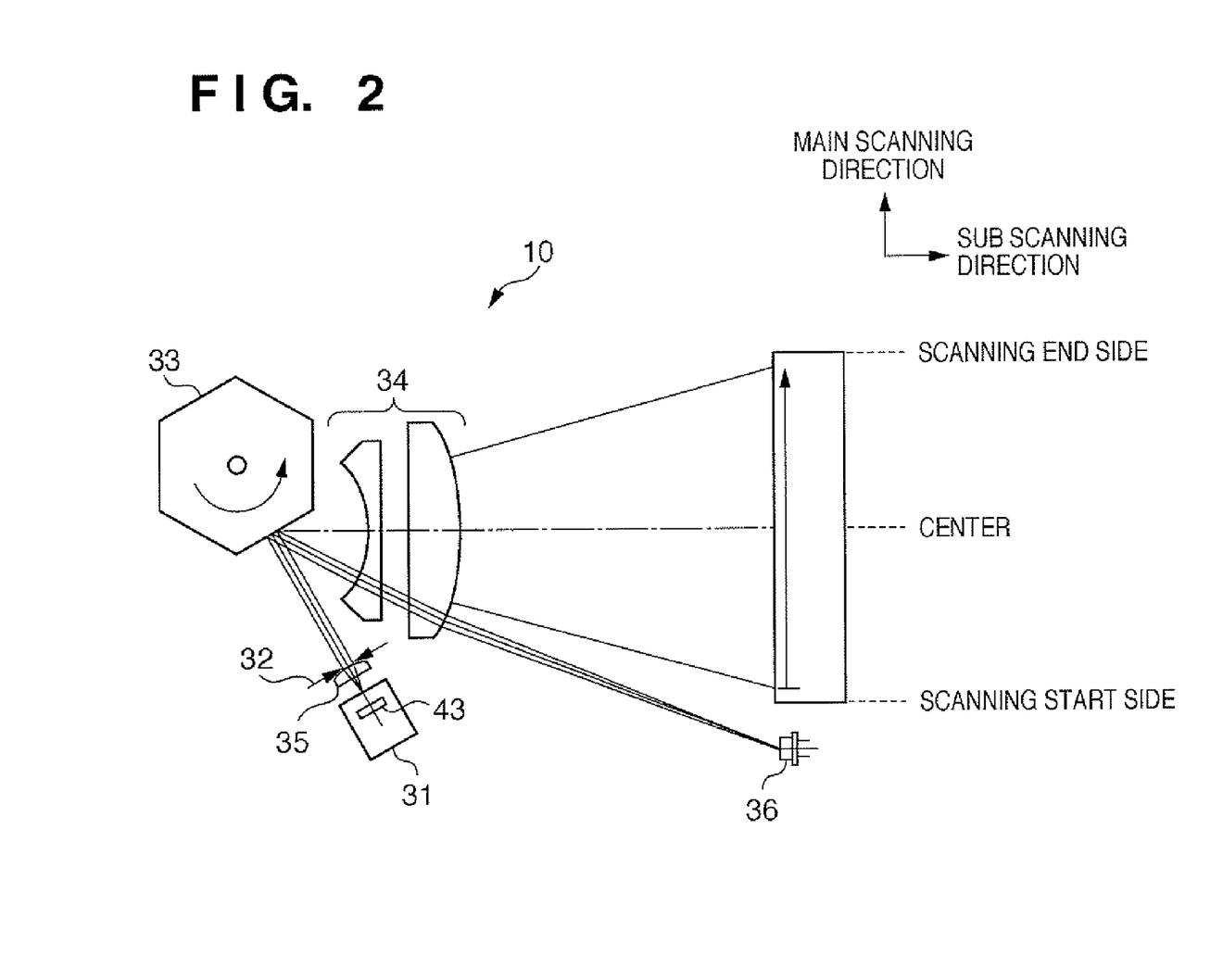
FIG. 2 is a diagram illustrating an example of an exposure control unit 10 according to an embodiment of the present invention.

FIG. 2 is a diagram illustrating an example of the exposure control unit 10 according to the present embodiment. A semiconductor laser driving unit 31 includes a semiconductor laser 43 that functions as the light source, and causes the semiconductor laser 43 to emit a pulse width modulated light beam based on the input image data. The light beam emitted by the semiconductor laser 43 is transformed into parallel light by a collimator lens 35 and an aperture 32. Having attained a desired beam diameter, the light beam falls on a rotating polygonal mirror 33, which serves as the deflection unit.

The rotating polygonal mirror 33 may be a vibrating mirror with a repeated reciprocating motion, such as a galvanometer mirror or the like. The rotating polygonal mirror 33 rotates at an equiangular speed. The light beam that has entered is reflected by the rotating polygonal mirror 33 during rotation, resulting in a deflected beam whose angle (direction of emission) changes continuously. The light beam that has become a deflected beam is collected by an f-θ lens 34. The f-θ lens 34 guarantees the temporal linearity of scans (that is, corrects distortion). The light beams that pass through the f-θ lens 34 scan the surface of the photosensitive member 11 at identical speeds in the direction of the arrow (the main scanning direction). The main scanning direction corresponds to the direction of the rotational axis of the photosensitive member 11. In a scan, the light beam travels across the surface of the photosensitive member 11 from the scanning start side, passing through the center, and then moving to the scanning end side.

A BD sensor 36 detects light reflected by the rotating polygonal mirror 33 and outputs a detection signal S36. The detection signal S36 is used as a synchronization signal for synchronizing the rotation of the rotating polygonal mirror 33 with the writing of data. "BD" stands for "beam detect".

Figure 3:
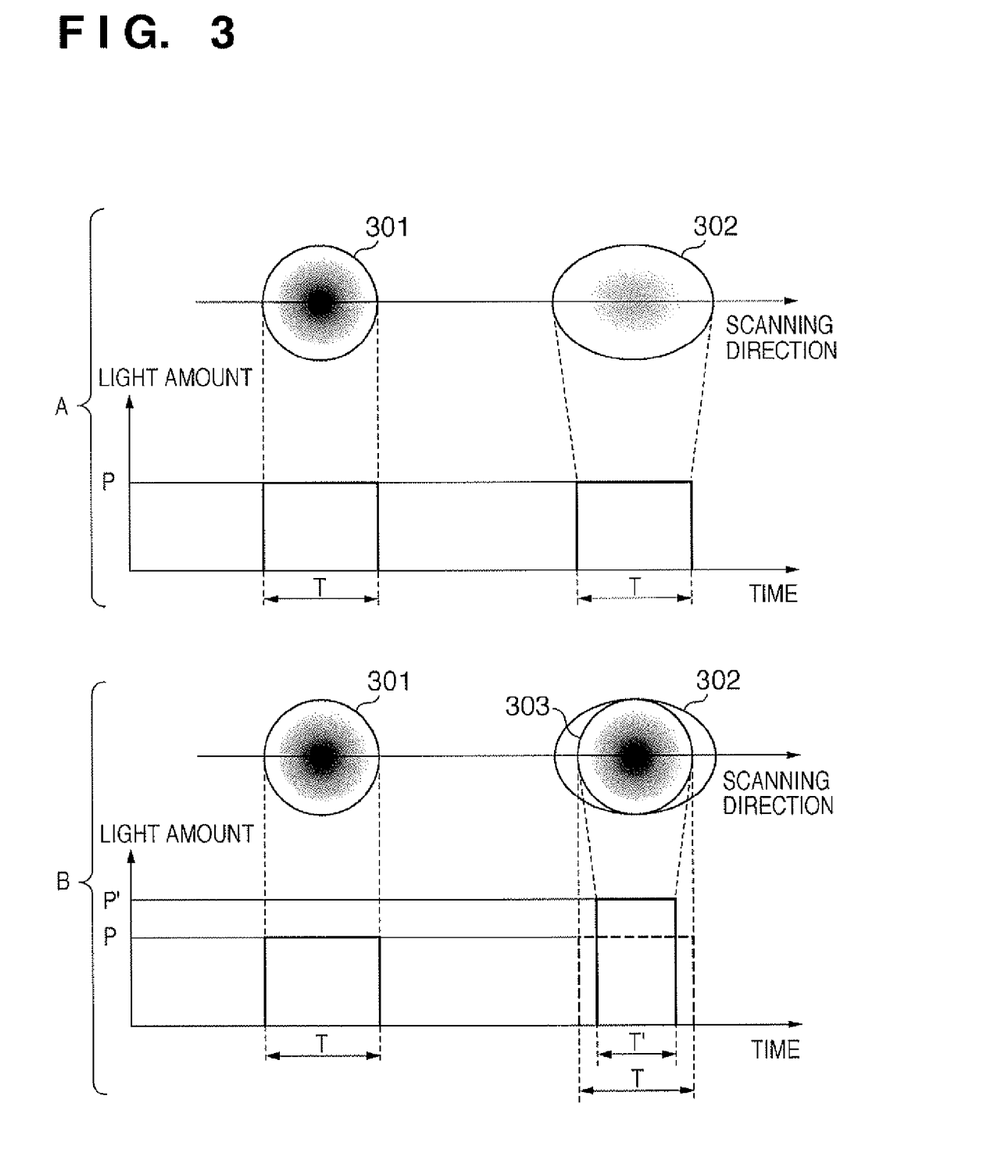
FIG. 3 is a diagram illustrating the basic principle of the present invention.

FIG. 3 is a diagram illustrating the basic principle of the present invention. In particular, A illustrates a spot 301 near the center of the photosensitive member 11 and a spot 302 near an end of the photosensitive member 11, prior to the execution of focus error correction. The spot 301 near the center has an ideal shape, but the spot 302 near the end has an expanded shape caused by focus error. In general, spot expansion due to focus error commonly occurs in the main scanning direction. The density of the spot shows a reduction in the light amount due to the spot expansion. Note that correction has not been performed on either of the light amounts. In other words, a light amount P is employed over a lighting time T in both the spot 301 near the center and the spot 302 near the end. This focus error occurs due to the optical path length differing depending on the position on the photosensitive member 11 that the light beam is scanning. In conventional apparatuses, focus error is corrected by moving the collimator lens 35 at high speeds in the optical axis direction in accordance with the scanning position of the light beam in the main scanning direction. However, because the light beam scanning itself is performed at high speeds, the speed of the movement of the collimator lens 35 cannot keep up with the scanning speed, making such focus error correction difficult.

In order to mitigate the influence of this focus error, the pulse width of the spot 302 near the ends is narrowed more than normal (that is, sharpened) and a higher amount of light than normal is applied, as indicated in B. That is, a corrected spot 303 is obtained using a lighting time T' (where T'<T) and a light amount P' (where P'>P). In this manner, reducing the formation time of the spot while increasing the light amount of the spot mitigates the expansion of the spot and the decrease in the light amount, which are caused by focus error.

Figure 4:
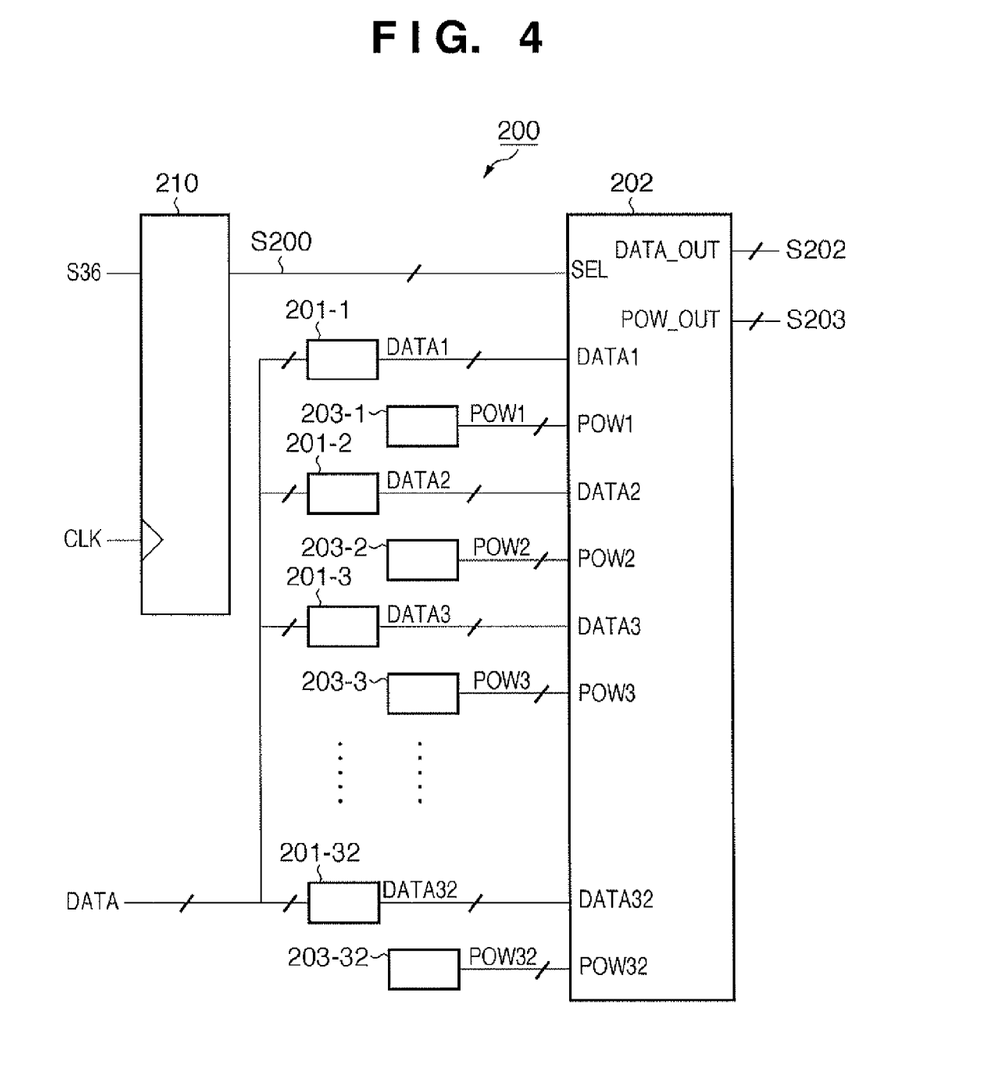
FIG. 4 is a diagram illustrating an example of a control circuit 200 in the exposure control unit 10 according to an embodiment of the present invention.

FIG. 4 is a diagram illustrating an example of a control circuit 200 in the exposure control unit 10 according to the present embodiment. This control circuit 200 converts an input image signal DATA into an image signal S202 and light amount correction data S203 and outputs the image signal S202 and the light amount correction data S203 to the semiconductor laser driving unit 31, in accordance with the present invention. Thus the control circuit 200 is an example of a correction unit that corrects the pulse width and light amount (strength) applied to the light beam at each scanning position in the main scanning direction on the image carrier in accordance with focus error in the light beam at each scanning position. Note that the fundamental principle of this correction is as was described using FIG. 3. That is, the control circuit 200 reduces the maximum pulse width value applied to scanning positions where the light beam has a high amount of focus error to less than the maximum pulse width value applied to scanning positions where the light beam has a low amount of focus error. The control circuit 200 furthermore increases the strength of the light beam applied to scanning positions where the light beam has a high amount of focus error to more than the strength of the light beam applied to scanning positions where the light beam has a low amount of focus error.

It should be noted that for the sake of simplicity, the present embodiment assumes that the main scanning direction of the photosensitive member 11 is divided into 32 blocks, and the control is based thereupon. Of course, the number of blocks may be another value, such as 8, 16, 64, 128, or the like. However, although more blocks leads to higher precision, it also increases demands placed on signal processing speeds, the storage capacities of memories, and so on. Therefore, an appropriate block number should be employed based on the specifications of the product (the image forming apparatus).

An address counter 210 resets its count value upon input of the detection signal S36 output by the BD sensor, and increments its count in accordance with an image clock CLK. The address counter 210 outputs the count value as an address S200. The detection signal S36 is inputted every scan cycle, and thus the address S200 serves as information for specifying the current scanning position (block) within a scan. Thus it can be said that the exposure control unit 10 or the address counter 210 is an example of a specifying unit that specifies the current scanning position.

Lookup tables 201-1 to 201-32 are tables that correspond to each scanning position (each block) from the scanning start side to the scanning end side, and store laser linearity correction data for correcting spot expansion based on the scanning position. Laser linearity correction data is information indicating the maximum pulse width value corresponding to a scanning position. The lookup tables 201-1 to 201-32 are therefore examples of tables that store a maximum pulse width value corresponding to each of blocks established by dividing the main scanning direction on the image carrier into multiple parts. The maximum pulse width value corresponding to the current scanning position is furthermore read out from the lookup tables 201-1 to 201-32 based on the address indicated by the address counter 210. The address counter 210 can thus be called an example of a readout unit.

Memories 203-1 to 203-32 are registers, RAMs, or the like, and store light amount correction data based on the focus error amounts, on a block-by-block basis. A selector 202 selects pulse widths, light amounts, and so on based on the address S200 (based on the block being scanned). The light amount correction data may also be stored as a table. The memories 203-1 to 203-32 can thus be called examples of tables that store a strength corresponding to each of blocks established by dividing the main scanning direction on the image carrier into multiple parts. Furthermore, the selector 202 is an example of a readout unit.

Figure 5:
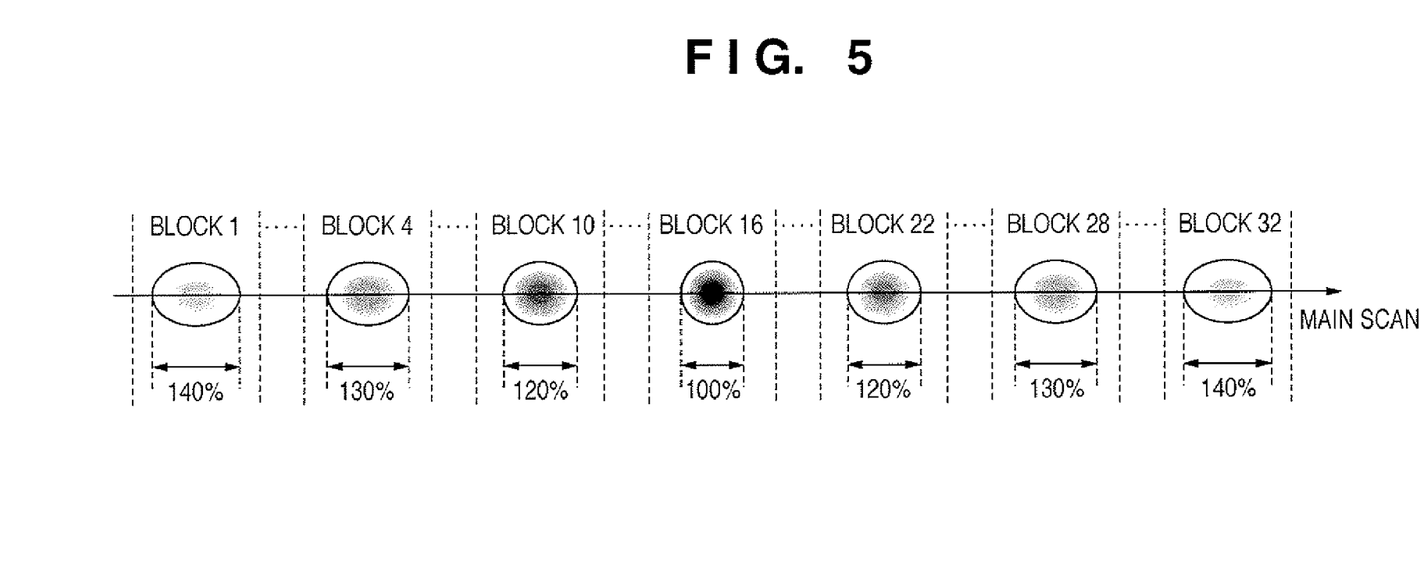
FIG. 5 is a diagram illustrating examples of spot expansion occurring in various blocks.
Figure 6:
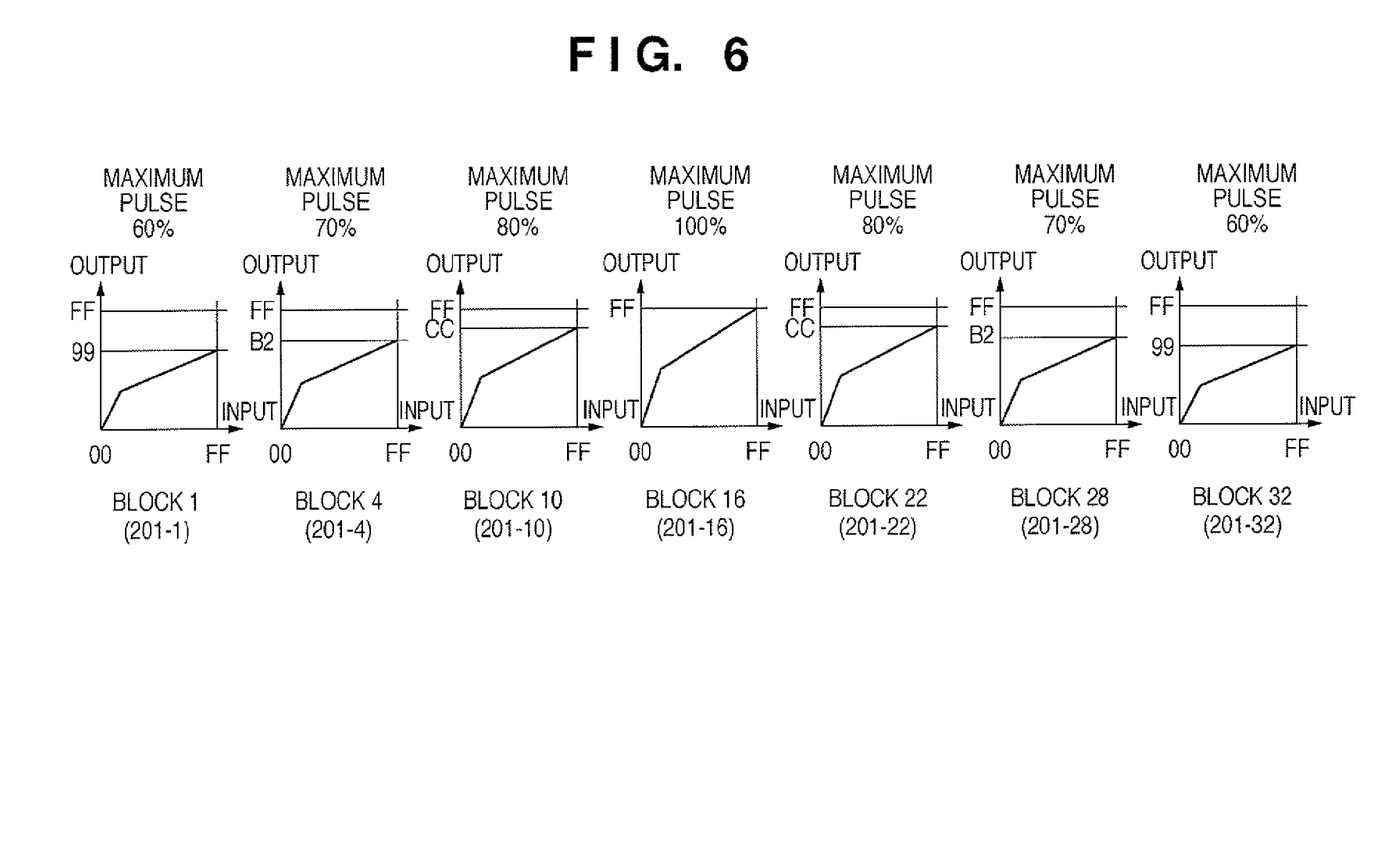
FIG. 6 is a diagram illustrating the maximum pulse width values in various blocks.

FIG. 5 is a diagram illustrating examples of spot expansion occurring in various blocks. The spots in the 1st block and the 32nd block have grown by 40% due to focus error. The spots in the 4th block and the 28th block, meanwhile, have grown by 30% due to focus error. Finally, the spots in the 10th block and the 22nd block have grown by 20% due to focus error. Note that the spot of the 16th block is in focus, and therefore has not expanded. FIG. 6 is a diagram illustrating the maximum pulse width values in various blocks. Because the spots in the 1st block and the 32nd block have grown by 40%, the pulse width in each has dropped by 40%. The maximum pulse width value is thus 60% of the reference pulse width. Similarly, in the spots in the 4th and 28th blocks, the pulse width has dropped by 30%. In the spots in the 10th and 22nd blocks, the pulse width has dropped by 20%. However, no drop in pulse width is applied to the spot in the 16th block.

Figure 7:
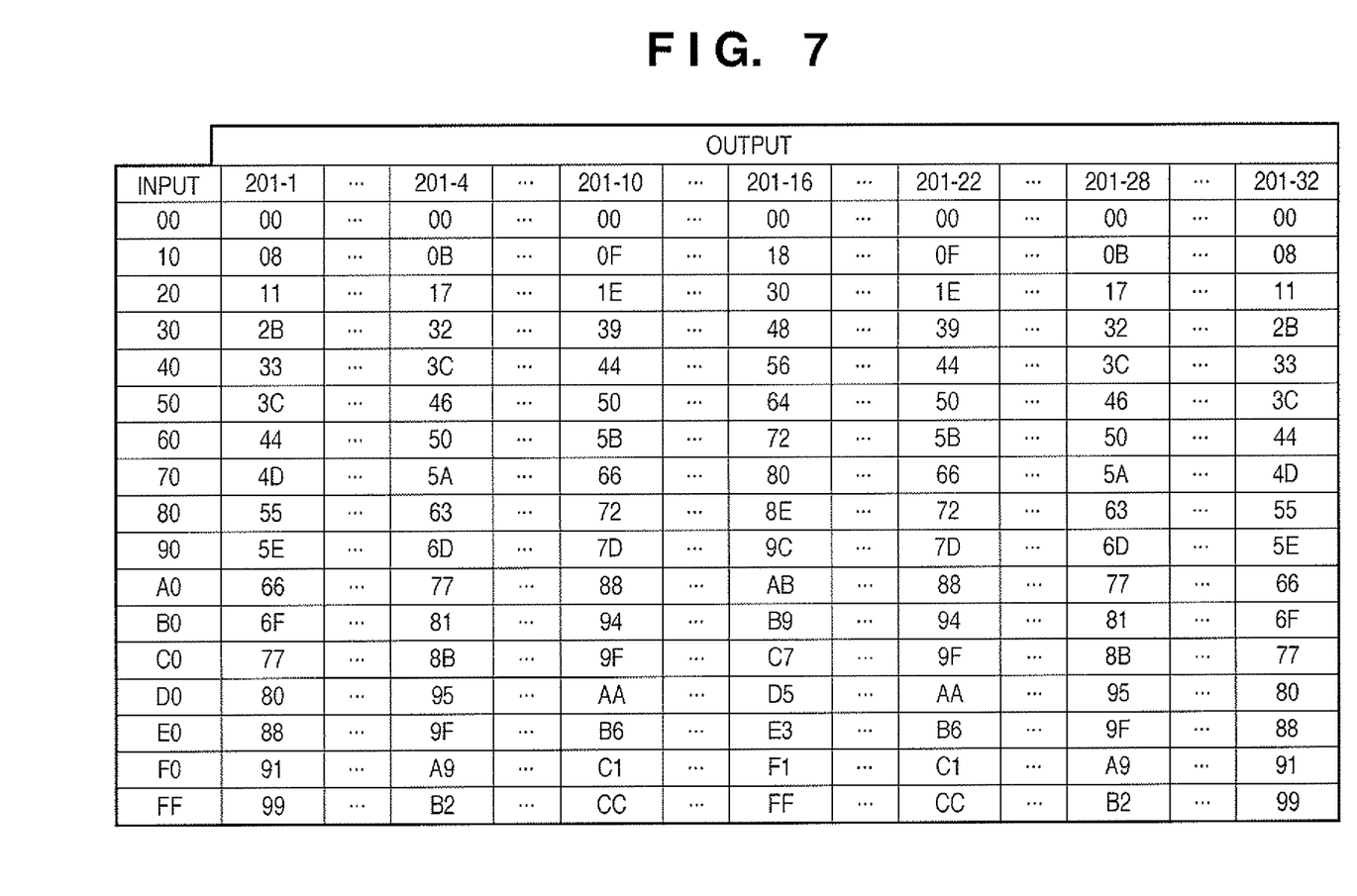
FIG. 7 is a diagram illustrating an example of a lookup table according to an embodiment of the present invention.

FIG. 7 is a diagram illustrating an example of a lookup table according to the present embodiment. Output data (DATA1 to DATA32) corresponding to input data (DATA) is stored in this lookup table on a block-by-block basis. This output data represents pulse widths.

For example, if the input data for the 1st block, located on the scanning start side, is FF, the output data is 99. This means that the pulse width is reduced by 40%. Meanwhile, if the input data for the 16th block, located in the center, is FF, the output data is FF as well. This means that the pulse width is not reduced. Finally, if the input data for the 32nd block, located on the scanning end side, is FF, the output data is once again 99. Thus a high degree of correction is applied to scanning positions where the influence of focus error is great, and a low degree of correction is applied to scanning positions where the influence of focus error is small. Furthermore, correction is not applied if there is no influence caused by focus error. In other words, the maximum pulse width value is reduced more the greater the spot expansion becomes.

Figure 8:
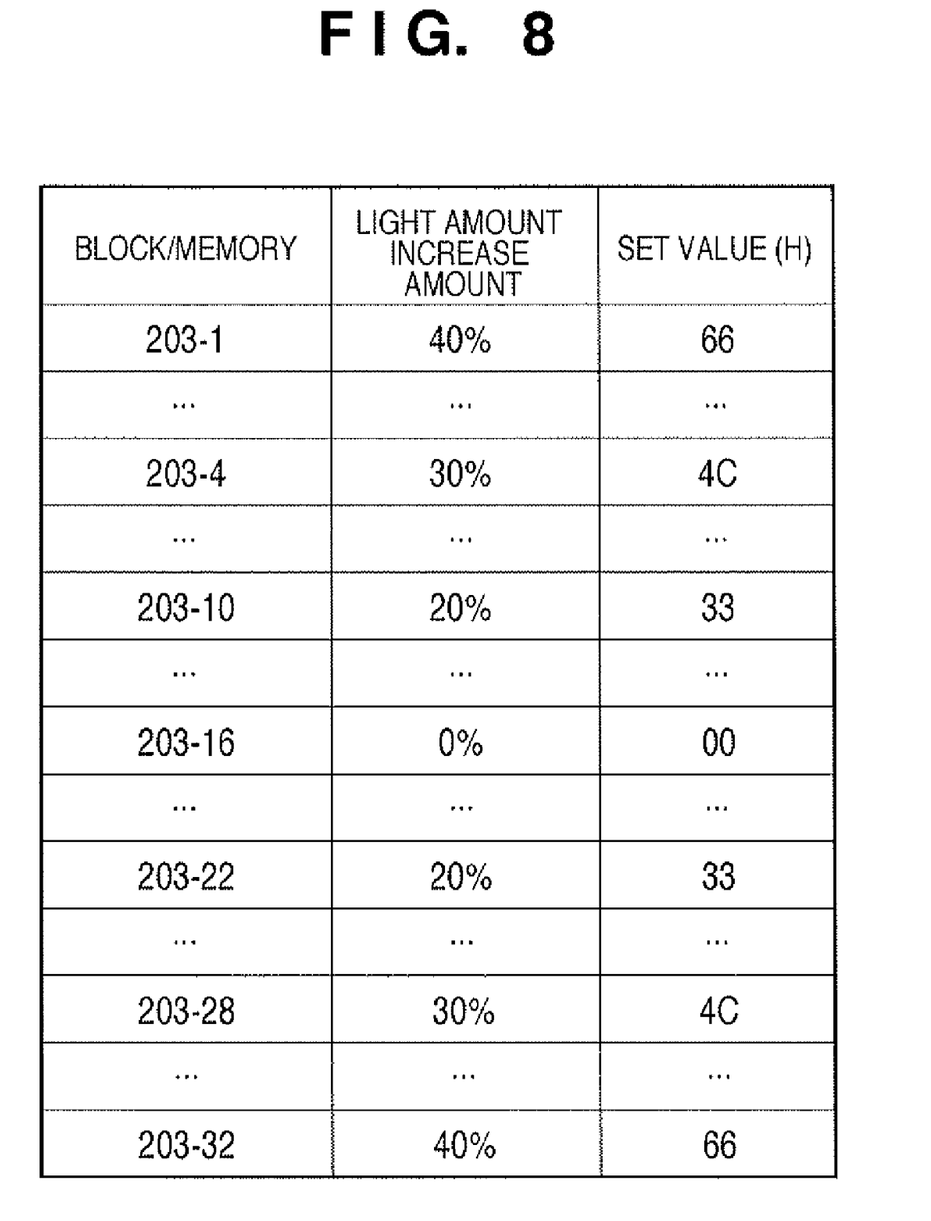
FIG. 8 is a diagram illustrating an example of light amount correction data according to an embodiment of the present invention.

FIG. 8 is a diagram illustrating an example of light amount correction data according to the present embodiment. As shown in FIG. 8, an increase amount for the light amount and a setting value indicating the increase amount are provided on a block-by-block basis. For example, because the maximum pulse width values of the 1st and 32nd blocks have been reduced by 40%, the increase amounts for the light amounts are 40% as well. In addition, because the maximum pulse width values of the 4th and 28th blocks have been reduced by 30%, the increase amounts for the light amounts are 30% as well. Furthermore, because the maximum pulse width values of the 10th and 22nd blocks have been reduced by 20%, the increase amounts for the light amounts are 20% as well.

Next, operations performed by the control circuit 200 of the exposure control unit 10 shall be described in detail. The image signal (DATA) input from the image reading unit 101 is input into all the lookup tables 201-1 to 201-32. The image signal has its laser linearity corrected in accordance with each of the blocks and is converted to the appropriate pulse width based on the scanning positions, and the resultant is output as DATA1 to DATA32.

The corrected DATA1 to DATA32 output from the lookup tables 201-1 to 201-32 are input into the selector 202. The selector 202 sets an end address for each block using a sequence controller, which shall be mentioned later. The selector 202 compares the end addresses set for each block with the address S200 from the address counter 210. Based on the result of the comparison, the selector 202 then selects a single piece of data from the DATA1 to DATA32 input from the lookup tables 201-1 to 201-32, and outputs that data as the image signal S202. In parallel with this, the selector 202 selects, based on the result of the comparison, a single piece of data from light amount correction data POW1 to POW32 output from the memories 203-1 to 203-32, and outputs that data to the semiconductor laser driving unit 31 as the light amount correction data S203. Thus an image signal S202 having a pulse width appropriate for each block, and light amount correction data S203 appropriate for each block, are outputted to the semiconductor laser driving unit 31.

Figure 9:
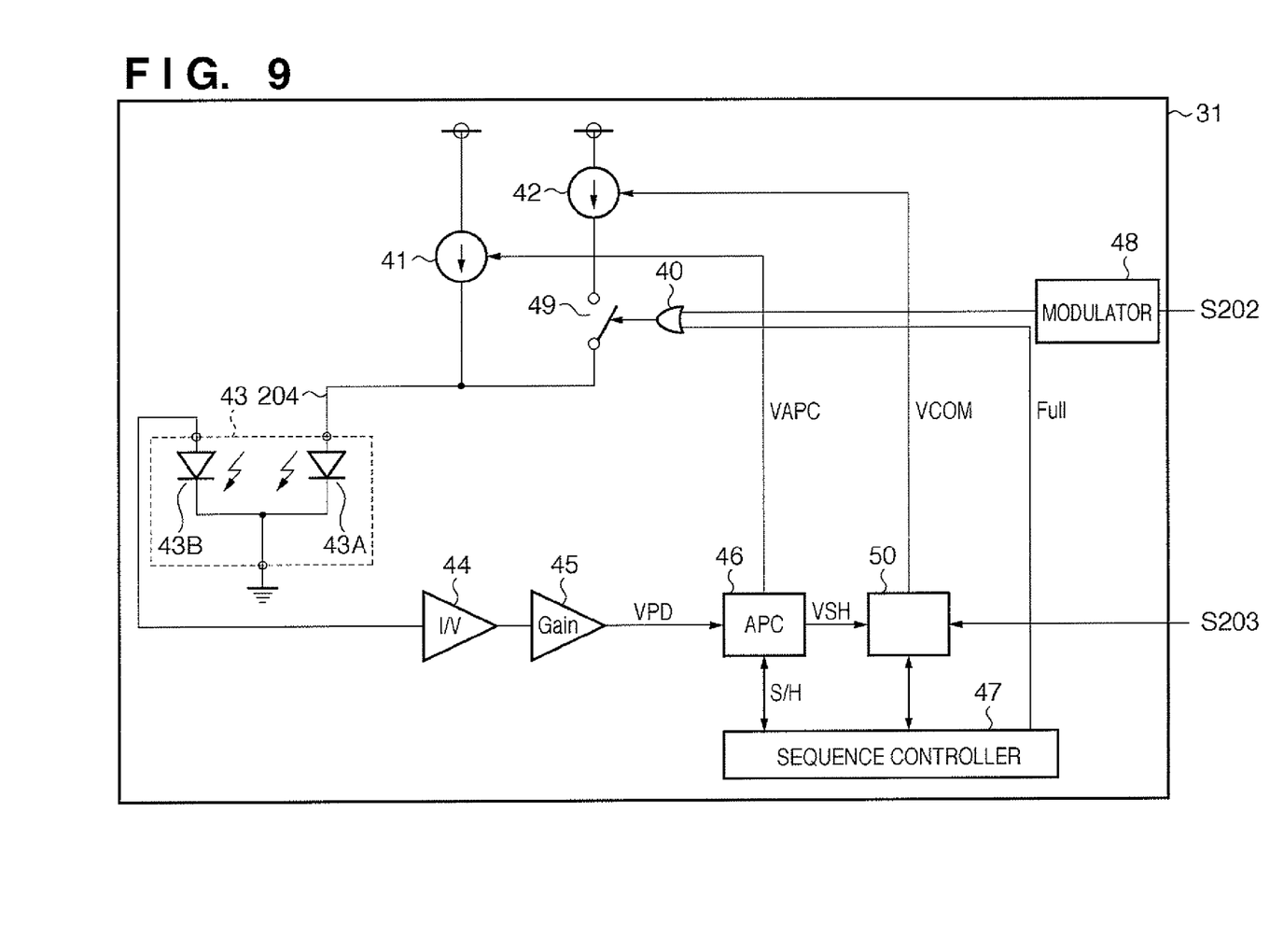
FIG. 9 is a block diagram illustrating an example of a semiconductor laser driving unit 31.

FIG. 9 is a block diagram illustrating an example of the semiconductor laser driving unit 31. The semiconductor laser 43 is a laser chip provided with a laser diode 43A and a PD sensor 43B. "PD" stands for "photodiode". A bias current source 41 functions as a bias current source for the laser diode 43A. A pulse current source 42 is a pulse current source for the laser diode 43A.

A modulator 48 executes pixel modulation based on the image signal S202 inputted from the selector 202, thereby creating a modulated signal. A logic element 40 calculates a logical sum of the modulated signal and a full lighting signal FULL from a sequence controller 47. A switch 49 turns on or off based on the result of the logical sum calculation. When the switch 49 turns on, the laser diode 43A is controlled to emit light using the sum of the current from the bias current source 41 controlled on a scan-by-scan basis and the current from the pulse current source 42 that is variably controlled during a scan. However, when the switch 49 turns off, the laser diode 43A is controlled to emit light using only the current from the bias current source 41.

An output signal from the PD sensor 43B, which monitors the light amount during full lighting emission (when the full lighting signal FULL is active), is transformed into a voltage signal by a current-to-voltage (I-V) converter 44. This voltage signal is amplified by an amplifier 45, and is then taken as a signal VPD; the signal VPD is input to an APC circuit 46. "APC" stands for "automatic power control".

A pulse current amount variable control unit 50 creates a signal VCOM for controlling the pulse current amount during a scan based on the light amount correction data S203, and controls the pulse current source 42. Light amount correction based on the focus error within a scan is executed thereby.

Figure 10:
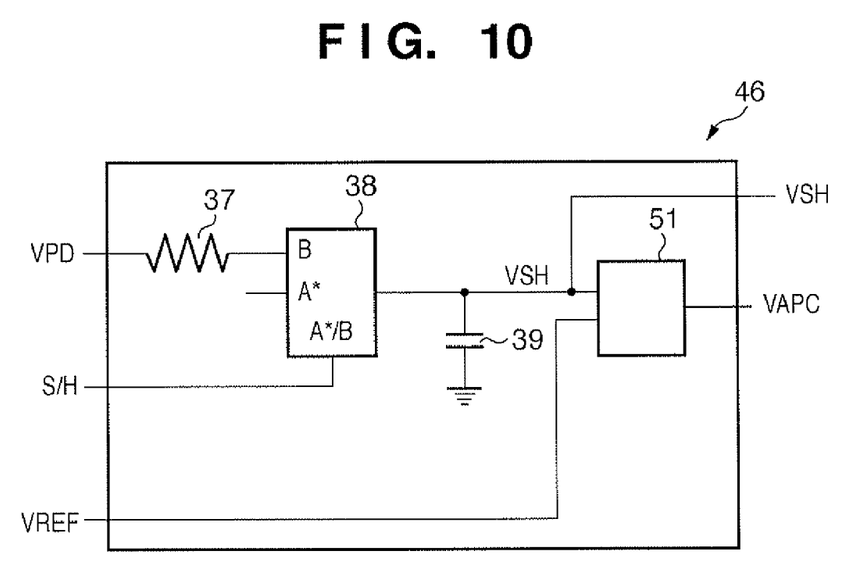
FIG. 10 is a circuit diagram illustrating an example of an APC circuit 46 according to an embodiment of the present invention.

FIG. 10 is a circuit diagram illustrating an example of the APC circuit 46 according to the present embodiment. An analog switch 38 samples the amplified PD sensor output VPD in accordance with a sample/hold signal S/H from the sequence controller 47. The sampled voltage value VSH is held at a time constant determined by a resistor 37 and a capacitor 39 while a scan is being performed. A comparator 51 compares the voltage value VSH with a predetermined reference voltage VREF, and outputs the difference signal VAPC between the two, the difference signal being the result of the comparison. The current from the bias current source 41 is controlled based on this difference signal VAPC. In other words, the current from the bias current source 41 is controlled on a scan-by-scan basis to take on the reference voltage value VREF (a target bias light emission value), and as a result, the bias light amount of the semiconductor laser 43A attains the desired light amount.

Figure 11:
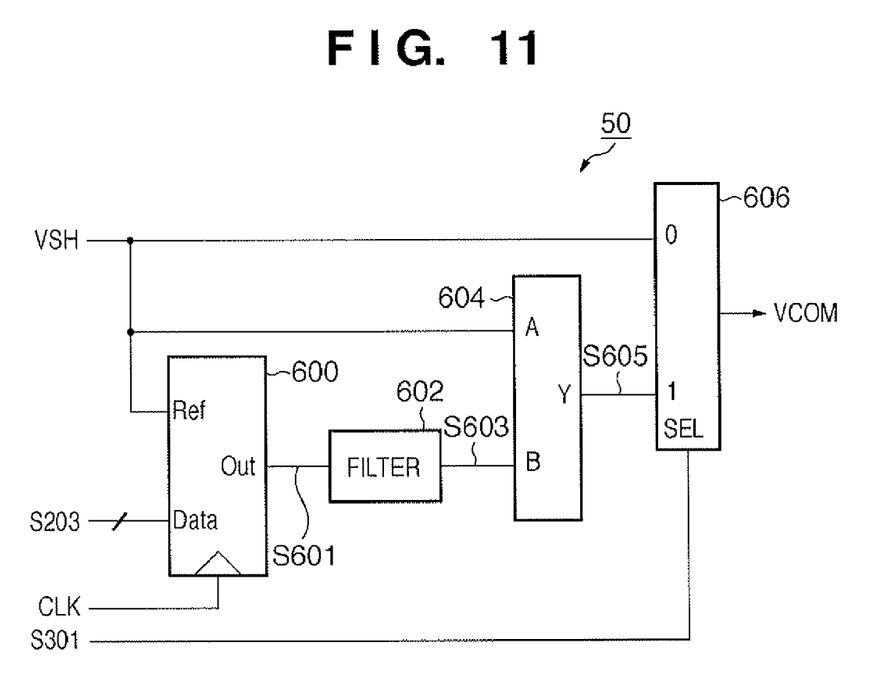
FIG. 11 is an exemplary circuit diagram illustrating a pulse current amount variable control unit 50 according to an embodiment of the present invention.

FIG. 11 is an exemplary circuit diagram illustrating the pulse current amount variable control unit 50 according to the present embodiment. A D/A converter 600 converts the light amount correction data S203 output from the selector 202 from digital to analog and outputs a voltage S601. The D/A converter 600 executes this conversion using the voltage value VSH output from the APC circuit 46 as a reference voltage. The D/A converter 600 furthermore operates in accordance with the image clock CLK. A low-pass filter 602, configured of capacitors, resistors, and so on, smoothes the voltage S601 output by the D/A converter 600 and outputs a smoothed voltage S603. An adder 604 adds the voltage S603 output from the low-pass filter 602 to the voltage VSH outputted from the APC circuit 46, and outputs a voltage S605 that is the sum thereof. An analog switch 606 switches between (selects) and outputs the voltage S605, offset by the amount of the voltage value VSH by the adder 604, and VSH, based on a BD mask signal S301.

Figure 12:
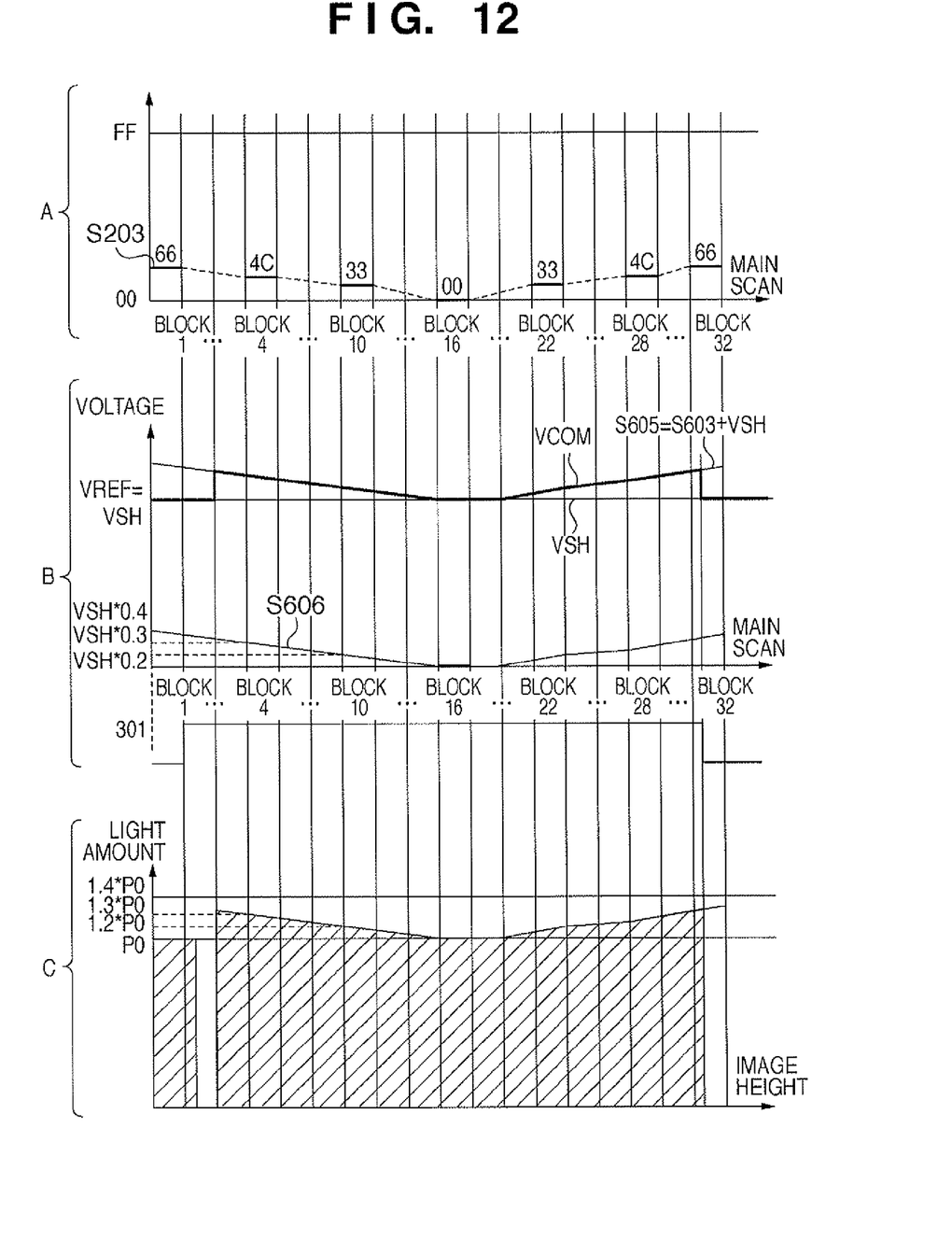
FIG. 12 is a diagram illustrating the flow of signal processing according to an embodiment of the present invention.

FIG. 12 is a diagram illustrating the flow of signal processing according to the present embodiment. A of FIG. 12 illustrates an example of the light amount correction data for each block as output by the selector 202. B, meanwhile, illustrates an example of the light amount correction signal VCOM output by the analog switch 606. VSH is input into the D/A converter 600 as the reference voltage VREF, and serves as the reference voltage used in the digital-to-analog conversion process. The light amount correction data S203 is also input into the D/A converter 600. For example, when the light amount correction data S203 is FFH, the D/A converter 600 executes digital-to-analog conversion so as to output VSH. Having been converted to analog, the voltage S601 passes through the low-pass filter 602 and is output as the voltage S603. For example, for the 1st block, the increase amount for the light amount is 40%, and thus the light amount correction data is 66H. Thus the voltage S603 has a voltage value that is 40% (=66H/FFH) that of VSH. The voltage S603 is offset by the voltage amount VSH by the adder 604, becoming a voltage S605. The voltage S605 is inputted into the analog switch 606.

The analog switch 606 selects the signal to output based on the BD mask signal S301. The analog switch 606 selects and outputs S605 in areas upon the photosensitive member that are scanned by the light beam (in other words, image regions). However, the analog switch 606 selects and outputs VSH in areas upon the photosensitive member that are not scanned by the light beam (in other words, non-image regions). In particular, VSH is selected for areas in the non-image regions in which the light beam scans the BD sensor (that is, BD areas) so that normal APC operations can be executed.

The pulse current source 42 is controlled based on VCOM output from the analog switch 606. The amount of light emitted by the semiconductor laser 43 is controlled as indicated in C of FIG. 12, based on the current from the pulse current source 42. In other words, the light amount can be increased when a spot has expanded and thus experiences a drop in its light amount.

According to the present embodiment, the pulse width and light amount are adjusted in accordance with the scanning position, making it possible to correct spots that have expanded and experienced a drop in light amount due to focus error to an appropriate pulse width and light amount. The shapes and light amounts of the spots within a scan thus become approximately equal, which makes it possible to provide an image forming apparatus with higher image quality.

In the embodiment described thus far, correction data for pulse widths and light amounts, obtained experimentally or logically, is stored in a table for each scanning position. However, this correction data may instead be calculated using arithmetic expressions found experimentally or logically. In other words, the control circuit 200 of the exposure control unit 10 functions as a calculation unit that calculates the pulse width and the light amount for each scanning position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-246597, filed Sep. 25, 2008 which is hereby incorporated by reference herein in its entirety.

What is claimed is:

1. A scanning optical apparatus, comprising:
 a light source configured to output a light beam in accordance with inputted image data;
 a deflection unit configured to deflect the light beam so that the light beam scans an image carrier;
 a detection unit positioned at a scanning line for detecting the light beam;
 a specifying unit configured to specify an exposure position on the image carrier in a scanning direction based on a detection timing at which the detection unit detects the light beam;
 a memory for storing correction data which corrects both of a time duration for which the light beam is continuously outputted to form one pixel and a light amount of the light beam, each of such correction data corresponding to an amount of focus error at exposure positions on the image carrier in the scanning direction; and
 a correction unit configured to read out the correction data corresponding to the exposure position specified by the specifying unit from the memory and to correct the time duration for which the light beam is continuously outputted to form the pixel and the light amount of the light beam based on the read out correction data.

2. The scanning optical apparatus according to claim 1, wherein the correction unit reduces a maximum pulse width value corresponding to a maximum time duration applied to exposure positions where the light beam has a high amount of focus error to less than the maximum pulse width value applied to exposure positions where the light beam has a low amount of focus error and increases the light amount applied to exposure positions where the light beam has a high amount of focus error to more than the light amount applied to exposure positions where the light beam has a low amount of focus error.

3. The scanning optical apparatus according to claim 1, wherein the specifying unit includes:
a counter which resets a count value when the detection unit detects the light beam and restarts counting,
wherein the specifying unit specifies the exposure position in accordance with the count value of the counter.

4. The scanning optical apparatus according to claim 1, wherein the correction unit includes a calculation unit for calculating the maximum pulse width value and the light amount corresponding to each of the exposure positions.

5. An image forming apparatus, comprising:
an image carrier;
the scanning optical apparatus according to claim 1, the scanning optical apparatus forming a latent image upon the image carrier by exposing the image carrier to light;
a developing apparatus for developing the latent image formed upon the image carrier, thereby creating a toner image;
a transfer apparatus for transferring the toner image onto a recording medium; and
a fixing apparatus for fixing the toner image onto the recording medium.

* * * * *